(No Model.)
H. BOOM.
CAR FENDER.
No. 589,156.  Patented Aug. 31, 1897.
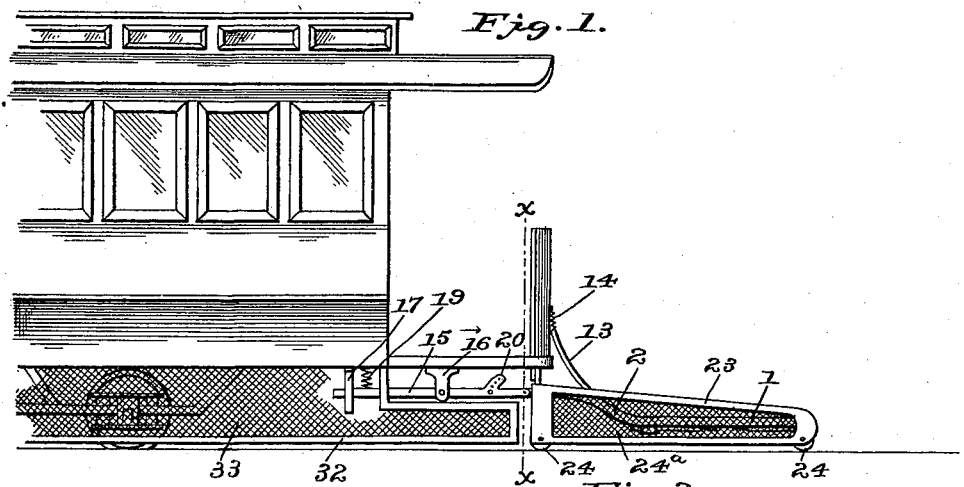
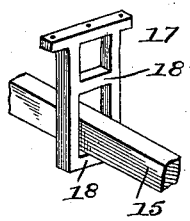
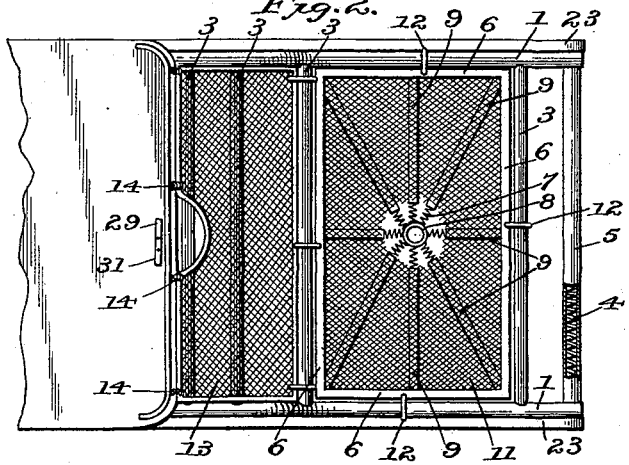
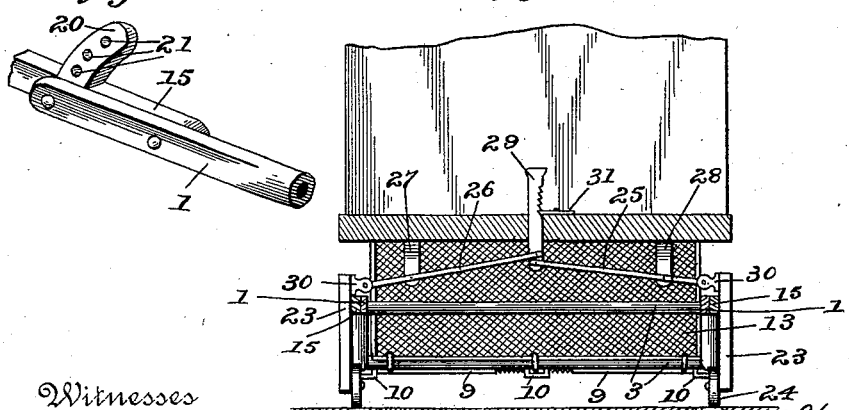
Witnesses
Edwin G. McKee
K. A. Nau
Inventor
Herman Boom
By John Wedderburn
his Attorney

UNITED STATES PATENT OFFICE.

HERMAN BOOM, OF NEW YORK, N. Y.

CAR-FENDER.

SPECIFICATION forming part of Letters Patent No. 589,156, dated August 31, 1897.

Application filed May 23, 1896. Serial No. 592,802. (No model.)

*To all whom it may concern:*

Be it known that I, HERMAN BOOM, a citizen of the United States, residing at New York, in the county of New York and State of New York, have invented certain new and useful Improvements in Car-Fenders; and I do hereby declare the following to be a full, clear, and exact description of the invention, such as will enable others skilled in the art to which it appertains to make and use the same.

This invention relates to car-fenders; and the objects are to provide certain novel features and combinations, so that danger to life and limb will be reduced to a minimum. Further objects are to provide a car-fender which shall be easily adjustable and detachable, but at the same time be so flexible that it will in no wise injure or maim the person falling thereon.

The invention consists of those improved features and combinations which appear in the following description and claims, as well as in the accompanying drawings, in which—

Figure 1 is a side elevation showing the invention applied to an ordinary electric car; Fig. 2, a plan view, and Fig. 3 a front elevation.

The fender-frame is made of iron piping or tubing. The side pieces 1 have their rear ends bent upwardly at 2 for attachment to the car, so that the body of the fender will lie close to the car-track, and these side pieces are connected by parallel cross-tubes 3, the forwardly-extending ends of the side pieces being connected by a coil-spring 4, incased in a rubber tube 5, which breaks the force of the impact with the person.

The bed of the fender consists of flat longitudinal and transverse springs 6, short coil-springs 7, radiating from a center ring 8, and flat springs 9, connected to the coil-springs and passing loosely through loops 10 on the under side of the longitudinal and transverse springs 6. The fender-bed is covered by a piece of wire-netting 11, which is fastened thereto.

The flat springs 6 and 9 are connected to the fender-frame by rings 12 in the manner shown.

The upper guard of the fender consists of strong wire-netting 13, having a suitable border whose forward end is connected by rings to the rear cross-bar of the fender-bed, while the rear end of this guard is detachably secured to the dashboard of the car by coil-springs 14.

The numeral 15 designates one of the hanger-bars, to whose forward extremity is pivoted the rear end of the fender side bars or pieces. Each of these hanger-bars is pivoted in a hanger 16, and the free end of the bar works freely in a guide 17, which is provided with cross-bars 18 to limit the vertical play of the bar. A heavy open coil-spring 19 resists the upward movement of the bar.

The fore end of the bar is provided with a forwardly-extending segment 20, having a series of holes 21. The rear extremity of the side piece of the fender-frame is provided with an aperture 22, which is adapted to register with any one of the holes 21, so that a pin may be inserted and the fender adjusted vertically as desired.

The side guards of the fender consist of a suitable frame 23, having rollers 24, which are adapted to travel on the car-track and to which is connected a piece of wire-netting $24^a$. Transverse levers 25 and 26, pivoted to hangers 27 and 28 and connected to a depressible rack-bar 29, under the control of the motorman, are secured to the side guards by a ball-and-socket joint 30, the members of which are prevented from turning by a pin which passes through registering apertures in said members.

Catch mechanism 31 is adapted to engage with the rack-bar, so that when the latter is depressed the side guards may be held at the desired height. When the pin is removed, the side guards may be turned up and out of the way.

I also provide the car body and truck with a suitable framework 32 and wire-netting 33 to prevent anything from rolling or being pushed under the car and between the wheels.

The operation is as follows: When a person is struck by the fender, the forward transverse spring cushions the impact and trips the person, who then falls on the fender-bed without receiving any injury, as the springs forming the bed cushion the fall, and impact is still further cushioned by the heavy coil-springs, which bear on the ends of the hangerarms. The upper guard prevents the person from coming into contact with the dashboard of the car. The side guards and truck-guard prevent the person falling from being rolled under the car.

When necessary, the whole fender or the side guards only may be swung up into vertical position by removing the proper pins.

Having thus described the invention, what is claimed as new is—

1. In a car-fender, the combination with a fender-bed, of side guards located at opposite sides of said fender-bed but independent of the latter and adapted for movement vertically independently thereof, and means for adjusting the said side guards vertically.

2. In a car-fender, the combination with a horizontal fender-bed, of side guards located at opposite sides of the fender-bed and extending vertically, said side guards being independent of the fender-bed, and means for adjusting the fender-bed vertically and also the side guards vertically but the latter being adapted for adjustment independently of the fender-bed.

3. In a car-fender, the combination with a fender-bed provided with cushion devices, of side guards independent of the fender-bed and adapted to move vertically, and means for simultaneously adjusting said side guards vertically in relation to the fender-bed, substantially as described.

4. In a car-fender, the combination with a fender-bed, of side guards, levers pivoted to the car-frame and connected to the side guards, a depressible bar connected to said levers, and catch mechanism for holding the side guards in adjusted position, substantially as described.

5. A car-fender comprising the combination of an open frame, connected to the car-body, a supplemental frame inside the open frame and consisting of coil-springs radiating from a central point, and wire-netting covering said supplemental frame, substantially as described.

In testimony whereof I have signed this specification in the presence of two subscribing witnesses.

HERMAN BOOM.

Witnesses:
GUSTAV E. MEINCKE,
WILLIAM TEGTMEYER.